April 15, 1930.  W. J. MacLELLAN  1,754,687
HOSE KNUCKLE
Filed Feb. 24, 1925
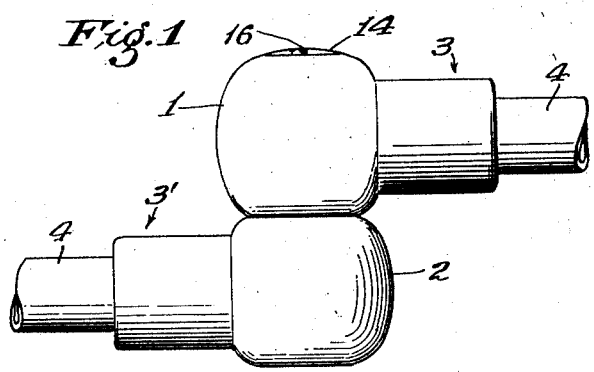
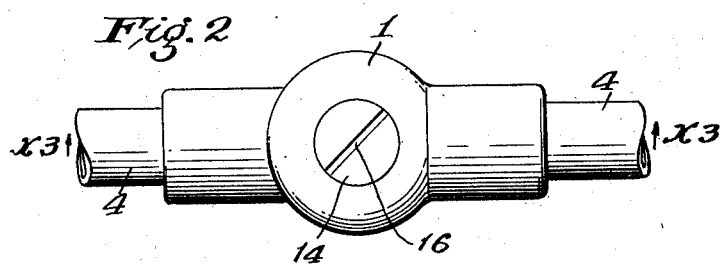
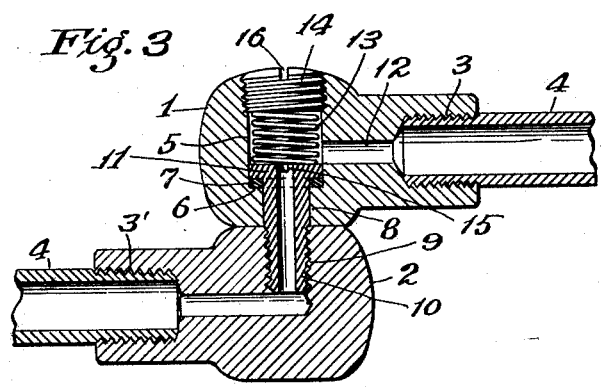
Witness
C. C. Holly
Inventor
William J. MacLellan
by James R. Townsend
his atty Patented Apr. 15, 1930

1,754,687

UNITED STATES PATENT OFFICE

WILLIAM J. MacLELLAN, OF BELLFLOWER, CALIFORNIA, ASSIGNOR OF ONE-FOURTH TO HIMSELF, ONE-FOURTH TO G. W. FOURNIER, ONE-FOURTH TO WILLIAM M. LAND, AND ONE-FOURTH TO JOSEPH H. ROGERS

HOSE KNUCKLE

Application filed February 24, 1925. Serial No. 11,137.

The object of this invention is to provide a knuckle pivotally connecting rigid tubular sections of a pressure hose.

The hose more particularly referred to is adapted for use in connection with grease guns for conducting grease under pressure from the grease gun and delivering it to a grease cup, which may be of any suitable character, such as hollow shackle bolts for automobile springs and various parts of automobiles and machine parts where lubrication with grease is desirable.

Objects of the invention are simplicity and perfect pivotal connection of the hose sections with each other and absolute security against leakage at the joints.

The invention is broadly new, basic and pioneer in that two knuckle members, one of which has a chamber and each having seats adapted respectively to be connected to hose sections are united by a tubular pin having a head in said chamber; and communicating between bores communicating with the hose connecting seats of the knuckle members, a closure for the chamber and a spring in said chamber to force the chambered knuckle member toward the head of the pin to tighten the joint between the head of the pin and the floor of the chamber.

Other objects, advantages and features of invention may appear from the accompanying drawing, the subjoined detailed description and the appended claim.

The accompanying drawing illustrates a hose knuckle or swivel hose joint embodying this invention as applied in a hose formed of tubular sections, fragments of which are shown.

Figure 1 is a side elevation of a hose joint embodying the invention.

Fig. 2 is a plan view of what is shown in Fig. 1.

Fig. 3 a vertical section on line $x^3$, Fig. 2.

1 and 2 are grease conducting knuckle members provided with threaded seats 3, 3' extending longitudinally of said members to receive threaded ends of rigid hose sections 4.

The knuckle member 1 is provided with a socket 5 extending transversely of the member and threaded at its upper end and having a shoulder 6 forming a seat for a washer 7 and having beyond the shoulder, a smooth bore 8.

The knuckle member 2 is provided with a transversely extending threaded bore 9 into which a tubular pin 10 is screwed. Said pin 10 has a slotted head 11, and is adapted to be inserted into the socket 5 and through the washer 7 and smooth bore 8, and screwed into the threaded bore 9 of the knuckle member 2. A port 9' extends longitudinally of the member and communicates with the bore 9 and seat 3'.

The knuckle member 1 is provided with a port 12 extending longitudinally and opening into the socket 5 above the head of the hollow pin 10 and connecting with the tubular section 4 screwed into the threaded seat 3 of said knuckle member 1.

13 is a spring in the socket 5; and 14 is a closure in the form of a plug screwed into the socket 5 and compressing the spring 13 against the head 11 of the pin and said head against the washer 7, which may be of any suitable material, as fiber.

It is thus seen that the knuckle members of the joint are connected together by a hollow pin inserted through a chamber in one of the knuckles and screwed into the other knuckle member, and that the tension of the spring held by the plug 14 causes the knuckle member 1 to be drawn tightly against the washer 7 which is thus held in tight contact by the head of the tubular pin, thus preventing leakage.

The head 11 is provided with a suitable slot or kerf 15 for a screw driver by means of which the threaded pin 10 may be driven home into the socket 9; and the plug 14 is provided with a slot 16 for a screw driver by which said plug may be screwed into the outer end of the socket 5. Said screw driver being of any well known construction is not shown in the drawing.

When the parts are assembled, the spring 13, acting between the plug 14 and the hollow pin 10 presses the shoulder 6 against the washer 7 to make a close joint between the shoulder, the washer and the head 11 of the hollow pin.

When the parts are thus assembled there is a non-leakable joint formed between the tubular sections 4 and this allows the sections 4 to be swung around relative to each other and without any leakage at the swivel joint thus formed.

I claim:

A hose knuckle comprising two members adapted to receive the ends of hose sections and provided with elongated ports, one of said knuckle members being provided with a socketed bore of substantially uniform diameter and in communication with its port and extending through the knuckle and provided with an annular shoulder, a washer in the socket in engagement with the shoulder, a threaded seat formed in the other knuckle member in alignment with said socketed bore and in communication with its respective port, a pin having an axial opening extending throughout the length thereof, and provided with a flat head, said pin being passed through said washer in one of the knuckle members and screwed to the threaded seat in the other knuckle member, and having its head in engagement with said washer, a coil spring mounted in the socketed bore with one end in direct engagement with the head of said pin, and a screw plug of uniform diameter mounted in the outer end of said socketed bore in engagement with the other end of said spring whereby the compression on said spring may be adjusted.

In testimony whereof, I have hereunto set my hand at Los Angeles, California, this 23rd day of September, 1924.

WILLIAM J. MacLELLAN.